(No Model.)
2 Sheets—Sheet 1.
L. GODDU.
MACHINE FOR SCREW THREADING WIRE.
No. 310,817. Patented Jan. 13, 1885.
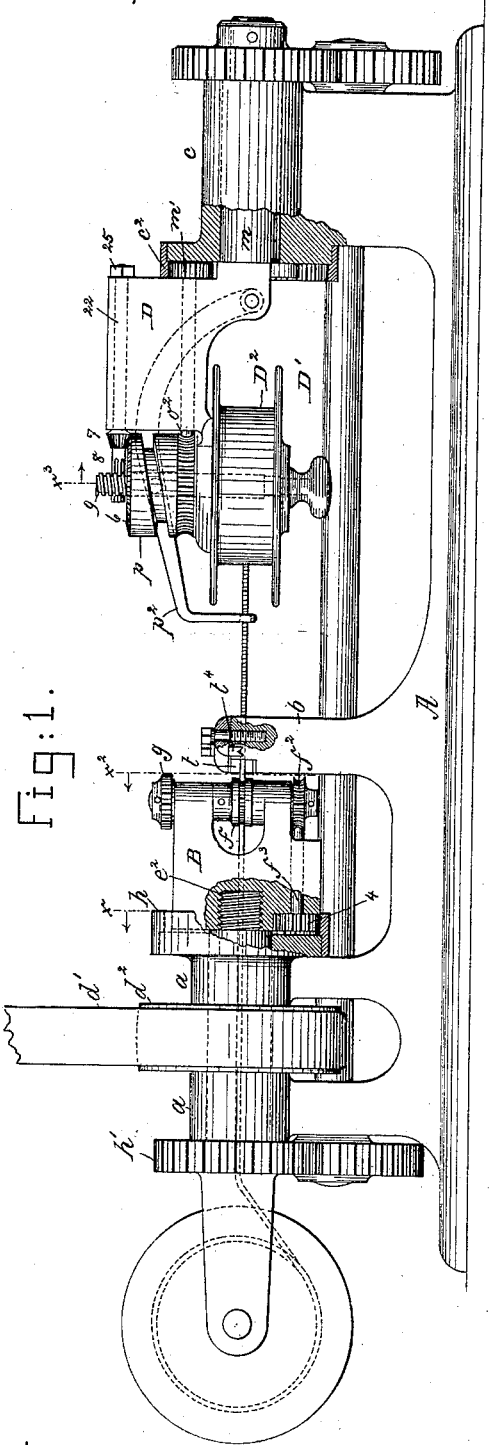
Fig: 1.
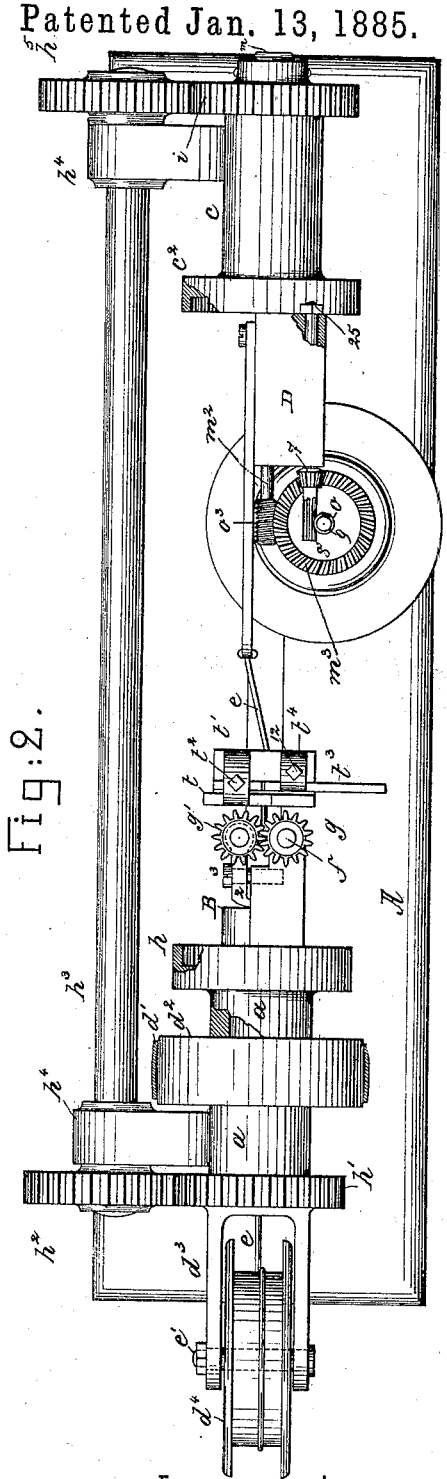
Fig: 2.
Witnesses.
Arthur Tipperton.
Henry Marsh.
Inventor.
Louis Goddu.
by Crosby & Gregory attys.

(No Model.) 2 Sheets—Sheet 2.

L. GODDU.
MACHINE FOR SCREW THREADING WIRE.

No. 310,817. Patented Jan. 13, 1885.

Witnesses.
Arthur Lippertin.
Henry Marsh.

Inventor.
Louis Goddu
by Crosby & Gregory attys

UNITED STATES PATENT OFFICE.

LOUIS GODDU, OF WINCHESTER, ASSIGNOR, BY MESNE ASSIGNMENTS, TO NATHANIEL S. HOTCHKISS, OF BOSTON, MASSACHUSETTS.

MACHINE FOR SCREW-THREADING WIRE.

SPECIFICATION forming part of Letters Patent No. 310,817, dated January 13, 1885.

Application filed March 24, 1884. (No model.)

*To all whom it may concern:*

Be it known that I, LOUIS GODDU, of Winchester, county of Middlesex, State of Massachusetts, have invented an Improvement in Machines for Screw-Threading Wire, of which the following description, in connection with the accompanying drawings, is a specification, like letters on the drawings representing like parts.

The object of my invention is to produce a machine in which the wire to be threaded is rotated, a stationary cutter or threading-tool acting upon the wire during its passage from one spool to another.

The especial features in which my invention consist will be specifically set forth in the claims at the end of this specification.

Figure 3:
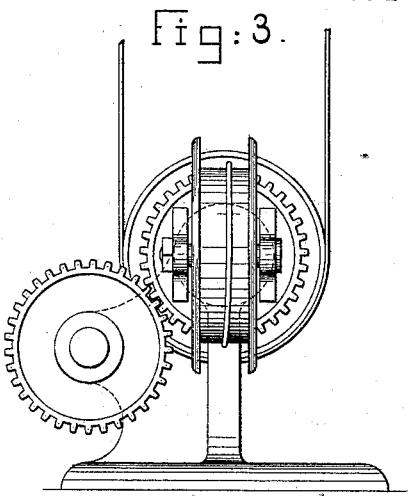
Figure 4:
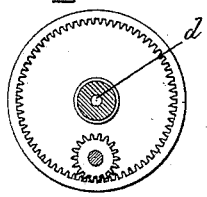
Figure 5:
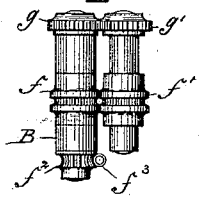
Figure 6:
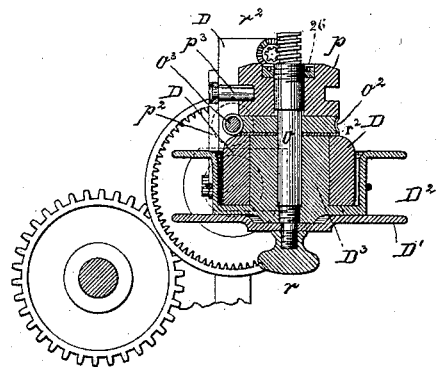
Figure 7:
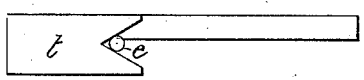

Figure 1 is a side elevation, partially broken out, of a machine embodying my invention; Fig. 2, a top view of Fig. 1, also broken out at places; Fig. 3, a left-hand end view of Fig. 1; Fig. 4, a section of Fig. 1 on the line $x$; Fig. 5, a section of Fig. 1 on the line $x^2$; Fig. 6, a section thereof on the line $x^3$, and Fig. 7 an enlarged detail showing the wire-rest and cutting or threading tool.

The frame-work A has bearings $a\ b\ c$ to sustain the various parts. Bearings $a\ a$ receive a sleeve or hollow shaft, $d$, which is rotated by a belt, $d'$, on a pulley, $d^2$. The sleeve $d$ at one end has ears $d^3$, which receive between them the spool $d^4$, carrying the wire $e$ to be screw-threaded, the spool being supported on a pin or bolt, $e'$. The opposite or inner end of the sleeve $d$, having a screw-threaded projection, $e^2$, (see Fig. 1,) has screwed upon it the roller-carrying head B, which is provided with a feeding-roller, $f$, grooved and serrated, as shown in Figs. 1 and 5.

Co-operating with the roller $f$ is a second like roller, $f'$, the journals of which are held by the boxes 2, attached to the said head by the screws 3. The shaft of the feeding-roller $f$ has fast upon one end of it a worm-gear, $f^2$, which is engaged and rotated by the worm on the worm-shaft $f^3$. The shaft of the roller $f$ has at one end a pinion, $g$, which engages a pinion, $g'$, fast on the shaft of the feed-roller $f'$. The worm-shaft $f^3$ has fast upon one end of it a pinion, 4, (see Figs. 1 and 4,) the teeth of which engage the teeth of the stationary ring-gear $h$, fixed with relation to the bearing $a$.

The sleeve $d$ has fast upon it the pinion $h'$, which engages the pinion $h^2$ and drives the long shaft $h^3$, held in the bearings $h^4$, and provided at its other end with the gear $h^5$, which in turn engages the toothed gear $i$, fast on the shaft $m$, placed in the bearing $c$ and provided with the head D, which carries the screw-wire receiving drum $D^2$, it having a removable flange, $D'$, and a hollow hub, $D^2$, which is extended loosely through a bearing made in the head D. (See Fig. 6.) The hub of the drum receives through it a spindle, $o$, with which it is connected firmly by the nut $r$, screwed up on the threaded end of the said spindle, the interior of the hub of the drum resting against a shoulder on the spindle, as best shown in Fig. 6. The spindle $o$ has placed upon it loosely a worm-gear, $o^2$, which is engaged and driven by a worm on a shaft, $m^2$, having a pinion, $m'$, which is engaged and driven by the teeth of the stationary ring-gear $c^2$, fast to the bearing $c$. The gear $o^2$ is driven at a certain speed by the shaft $m^2$, and drives the drum $D^2$ frictionally through a friction-washer, $r^2$, placed between the end of the hub of the drum and the side of the pinion, whereby as the mass of wire on the drum increases the drum and spindle $o$ will slip or fall behind the speed of rotation of the worm-pinion $o^3$. The cam-hub $p$ is placed loosely upon the spindle $o$, and is driven therein at a reduced speed through the threaded portion $g$ of the spindle $o$, which engages a long gear, 8, on a short shaft in the head D, the said shaft having an attached bevel-gear, 7, which engages teeth on and drives the cam $p$, so that the latter by its groove which receives the pin $p^3$ of the wire-distributing arm $p^2$ effects the vibration of the said distributer always at a speed proportional to that of the drum. The shaft 22 has a thread at one end, which receives a nut, 25, the latter retaining the said shaft in the head D against longitudinal motion, the length of the threaded part of the shaft 22 being such as to leave sufficient space between the nut 25 and the bevel-gear 7 to permit the free rotation of the shaft 22. The outer end of the cam $b$ is chambered (see Figs. 2 and 6) to receive a nut, 26, which, screwed upon a threaded portion of the spindle $o$, governs the force of the pressure exerted between the drum and the friction-disk, pinion $o^3$, and cam $p$. The wire $e$, after passing from the rollers $f\,f'$, enters a notch of wire rest or guide, $t$, held adjustably in place by a block, $t'$, and screw $t^2$, and just beyond the said rest the wire is acted upon by a cutting or threading tool, $t^3$, held adjustably in place by a block, $t^4$, and screw 12.

The invention described will thread wire on its passage from one to another spool, both spools being revolved and rotated to deliver and wind up the material.

I claim—

1. In a machine for screw-threading wire, a spool to hold the wire to be threaded, a spool to receive the wire after it is threaded, combined with a stationary cutting or threading tool, and with means to revolve both spools to rotate the wire in contact with the said tool, substantially as described.

2. The hollow rotating spindle, the wire-holding spool connected therewith, the head and its feeding-rollers, and the stationary gear $h$, combined with the shaft $f^3$, and gearing to rotate the said feeding-rollers, substantially as described.

3. In a machine for screw-threading wire, the shaft $m$, its attached head, the spindle $o$, the loose gear $o^2$ thereon, and means to rotate it, combined with the frictionally-driven wire-receiving spool placed on the said spindle, the parts operating substantially as and for the purpose described.

4. In a machine for threading wire, the shaft $m$, its attached head, the spindle $o$, the loose gear $o^2$ thereon, means to rotate it, the wire-receiving spool placed on the said spindle and driven frictionally, as described, combined with the cam $p$, mounted loosely on the said spindle, the wire-distributer or arm, and with means between the said spindle and cam to rotate the latter, substantially as described.

5. The hollow spindle or shaft $d$, the spool $d^4$, rotated with it, the head B, feeding mechanism, and means to actuate the latter, combined with the shaft $m$, its head D, the spindle $o$, carried in the said head, means to rotate it, and the spool $D^2$, the material $e$ from the spool $d^4$ being wound upon the spool $D^2$, substantially as described.

6. The hollow spindle $d$, its attached spool, the head, the feeding mechanism, means to actuate the latter, the wire-rest and threading-tool, and the shaft $m$, its attached head D, the spindle $o$ therein, the spool $D^2$, and means to rotate the spindle $o$ and the said spool, combined with means to rotate the spindle $d$ and shaft $m$, substantially as described.

7. The spindle $o$, provided with the threaded portion 9, the drum attached to it, the worm-pinion $o^2$, and cam loose on the said spindle, a friction-disk between the said pinion and drum, and means to rotate the said pinion, combined with gearing between the spindle and cam to rotate the latter at a given relative speed as compared with that of the drum, and with a distributer to distribute the said wire on the drum from flange to flange, substantially as described.

In testimony whereof I have signed my name to this specification in the presence of two subscribing witnesses.

LOUIS GODDU.

Witnesses:
   G. W. GREGORY,
   W. H. SIGSTON.